(12) United States Patent
Pasquali et al.

(10) Patent No.: US 8,643,647 B2
(45) Date of Patent: Feb. 4, 2014

(54) DISPLAY OF TRAVEL ROUTES

(75) Inventors: Jean Pasquali, Mougins (FR); Robert Karpp, Peymeinade (FR)

(73) Assignee: Amadeus S.A.S., Sophia Antipolis (FR)

( * ) Notice: Subject to any disclaimer, the term of this patent is extended or adjusted under 35 U.S.C. 154(b) by 1219 days.

(21) Appl. No.: 12/535,171

(22) Filed: Aug. 4, 2009

(65) Prior Publication Data
US 2011/0025692 A1  Feb. 3, 2011

(30) Foreign Application Priority Data

Jul. 28, 2009  (EP) ..................................... 09305708

(51) Int. Cl.
*G06T 11/20* (2006.01)
(52) U.S. Cl.
USPC ............................. 345/440; 345/581; 345/619
(58) Field of Classification Search
None
See application file for complete search history.

(56) References Cited

U.S. PATENT DOCUMENTS

| | | | |
|---|---|---|---|
| 4,953,105 A | 8/1990 | Hirata et al. | |
| 6,011,559 A * | 1/2000 | Gangopadhyay et al. | 345/440 |
| 6,421,072 B1 | 7/2002 | Ku et al. | |
| 2005/0220351 A1* | 10/2005 | Vanderwende et al. | 382/229 |
| 2006/0195420 A1* | 8/2006 | Kilroy | 707/3 |
| 2010/0060643 A1* | 3/2010 | Kolipaka et al. | 345/440 |
| 2010/0169311 A1* | 7/2010 | Tengli et al. | 707/736 |

OTHER PUBLICATIONS

Gansner et al., A Technique for Drawing Directed Graphs, Date: 1993, Publication: IEEE Trans. Software Eng., v19, #3, pp. 33.*
Bhattacharya et al., Double-Tree Scan: A Novel Low-Power Scan-Path Architecture, Date: 2003, Publication: ITC International Test Conference, pp. 10.*

* cited by examiner

*Primary Examiner* — Jwalant Amin
(74) *Attorney, Agent, or Firm* — Wood, Herron & Evans, LLP (57) ABSTRACT

A method of displaying a graph of nodes adapted to the display of travel routes is described. The method includes the steps of finding a node of highest weight among all nodes of the graph after each node is attributed a weight based on a number of nodes pertaining to a double-tree structure of nodes of which each node is assumed to be the root. Then, the double-tree structure of nodes having the node of highest weight as root is extracted and a layout is computed. If there are remaining nodes left, they are grouped in one or more sub-graphs and a layout of the one or more sub-graphs is iteratively computed. The one or more sub-graphs are then merged with the double-tree structure of nodes to be displayed.

20 Claims, 8 Drawing Sheets

Prior Art

```
FQR AAABBB/EK8902/0004/A
ADDON           SPECIFIED  EK8902  ADDON           EFF09OCT05
 1 * LJU-JP-ZRH/FRA/PAR/LON-DXB-BAH/DOH/MCT/KWI/RUH/THR/
     SAH/KRT/JNB/ACC/LOS/NBO/MRU/EBB/SEZ/CAS/DAR/BOM/DEL/
     MAA/HYD/COK/KHI/ISB/PEW/LHE/OSA/SHA/JKT/MNL/PER/SEL
 2 * LJU-JP-ZRH/FRA/PAR/LON-DXB-CMB-MLE/SIN
 3 * LJU-JP-ZRH/FRA/PAR/LON-DXB-BKK-HKG
 4 * LJU-JP-ZRH/FRA/PAR/LON-DXB-SIN-MEL/BNE-AKL
 5 * LJU-JP-ZRH/FRA/PAR/LON-DXB-BKK-SYD-AKL
 6 * LJU-JP-ZRH/FRA/PAR/LON-DXB-MEL-CHC
 7 * LJU-JP-ZRH/FRA/PAR/LON-DXB-DAC-KUL
>                                                PAGE  1/ 1
>_
```

DISPLAY OF TRAVEL ROUTES

FIELD OF THE INVENTION

The present invention relates generally to the layout of graphs, and more specifically, to an automated method adapted to obtain easy-to-read display of airline routes between cities, method which is not computation intensive.

BACKGROUND OF THE INVENTION

Due to its large scope of potential applications the automation of the drawing of two-dimensional graphs has received a considerable attention over the past decades, resulting in the publication of a countless number of papers by the engineering and academic communities describing methods and techniques to draw graphs, often for a particular context. Nevertheless, the drawing of graphs in the general case remains a very hard problem for which a single best solution does not exist. Typical of the publications made on this subject is a paper by Gansner and al. from AT&T Bell Laboratories, untitled: *A Technique for Drawing Directed Graphs'*, published in 1993 in IEEE Transactions on Software Engineering, ISSN: 0098-5589. The proposed technique describes a four-pass algorithm including an iterative heuristic for reducing edge crossing. Indeed, to be able to obtain good results in this domain, sophisticated iterative multi-pass algorithms combined with heuristics requiring the tuning of parameters need to be implemented.

Figure 1:
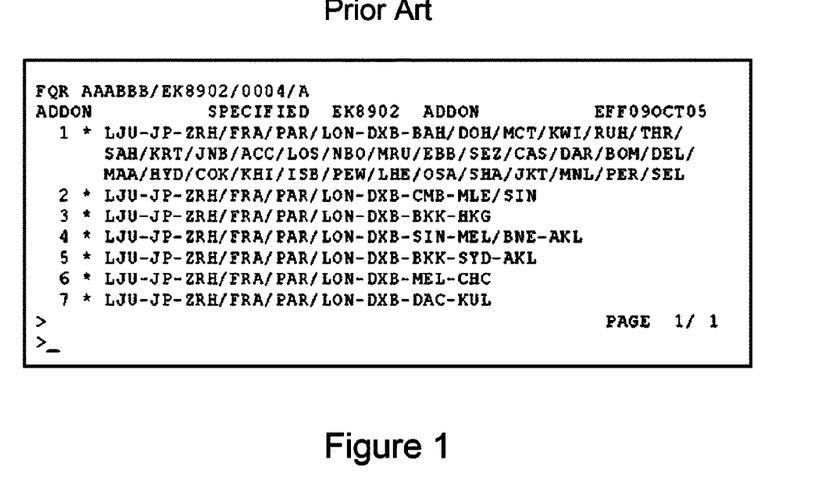
FIG. 1 shows an exemplary display of airline routes in text mode.

In the airline industry, the visualization of airline routes is a function which has also a lot of applications. Although it is a highly useful function for professionals of this industry (e.g., to let them establish fares, to find alternate routes to a destination or just to have a view of a complete airline network) it is in practice rather poorly supported. Airline routes are nothing else but graphs where nodes are the cities and edges (i.e., the connections between nodes) the routes served by the various airline companies operating planes between any of the city airports around the world. The way routes are displayed by current airline software products often consists in getting an exhaustive list of all the paths in the network considered, an example of which is shown in FIG. 1 where cities are abbreviated by their 3-letter IATA (international air transport association) codes. It is really not that easy though to understand the structure of a particular graph of city nodes from its list of edges and paths.

The generalization of the use of graphic displays, even in industries where large reliable data centers are implemented from mainframe computers, potentially allows the display of graphs in graphic mode so as to make them more easily readable. These large data centers are those put in place, e.g., by any of a few global distribution systems (GDSs) that provide travel services to all the professionals of this industry including the traditional travel agencies. Such a GDS is for example AMADEUS, a European travel service provider with headquarters in Madrid, Spain. Often, monochrome 'green-screen' like display are still however in use, in an emulation mode, on modern personal computers or terminals that display text-only windows like the one shown in FIG. 1 (often, contrary to what is shown, on a dark background). In text-only mode the control of the software applications run from the above large data centers is then done by the professionals of this industry in a so-called cryptic mode through the use of esoteric control codes. This mode of controlling the travel software applications is however often preferred because it is in practice more efficient once the control codes and their parameters have been all learnt and kept in mind.

Still, it has severe limitations, like having to display in text mode a connected graph of city nodes while a graphic display would be much more appropriate in this case.

However, as stated above, the drawing of graphs on a graphic display is not an easy task in itself. It requires the use of iterative multi-pass sophisticated algorithms possibly also requiring having to set heuristic parameters to tune the results.

Therefore, it is a main object of the invention to disclose a simple all-automated method of drawing graphs adapted to the display of airline routes and of other transportation means on a graphic display.

It is a specific object of the invention that the method neither requires the use of complex iterative algorithms nor the setting of heuristic parameters to always obtain easy-to-read display of graphs.

It is a further object of the invention that computation time of the method only grows linearly with the number of nodes to display.

Further objects, features and advantages of the present invention will become apparent to the ones skilled in the art upon examination of the following description in reference to the accompanying drawings. It is intended that any additional advantages be incorporated herein.

SUMMARY OF THE INVENTION

The above objects of the invention are fulfilled by providing a method of displaying a graph of nodes adapted to the display of travel routes. The method comprises the steps of finding a node of highest weight among all nodes of the graph after each node is attributed a weight based on a number of nodes pertaining to a double-tree structure of nodes of which each node is assumed to be the root. Then, the double-tree structure of nodes having the node of highest weight as root is extracted and a layout is computed. If there are remaining nodes left, they are grouped in one or more sub-graphs and a layout of the one or more sub-graphs is iteratively computed. The one or more sub-graphs are then merged with the double-tree structure of nodes to be displayed.

The invention may also be comprised of one or of a plurality of the optional following features:

the double-tree structure of nodes is optionally comprised of parent nodes and/or of child nodes respectively situated on left side and right side of the root node;

a node height is recursively computed for each node of the graph by gathering node heights of all attached parent nodes or child nodes;

the height of the root node is whichever is larger of height of parent nodes or height of child nodes;

the height of the root node determines the size of the double-tree structure of nodes and the referential from which all node coordinates are computed;

Y-coordinate of each node is recursively computed from node heights of all attached parent nodes or child nodes;

the double-tree structure of nodes and the one or more sub-graphs have a frozen layout of Y and X coordinates of nodes;

Y and X coordinates include predetermined Y and X spaces;

the merging step consists in a vertical juxtaposition of the double-tree structure of nodes and of the one or more sub-graphs;

the merging step includes interconnecting the one or more sub-graphs with the double-tree structure of nodes;

the graph nodes designate airline companies or cities served by the airline companies and wherein graph edges represent scheduled airline flights between cities;

the graph nodes optionally comprise a plurality of cities or a plurality of airline companies;

at least one of the graph nodes is displayed as a scrollable list of cities or of airline companies.

The invention further discloses a system and a computer program product adapted to display travel routes.

DETAILED DESCRIPTION

The following detailed description of the invention refers to the accompanying drawings. While the description includes exemplary embodiments, other embodiments are possible, and changes may be made to the embodiments described without departing from the spirit and scope of the invention.

Figure 2:
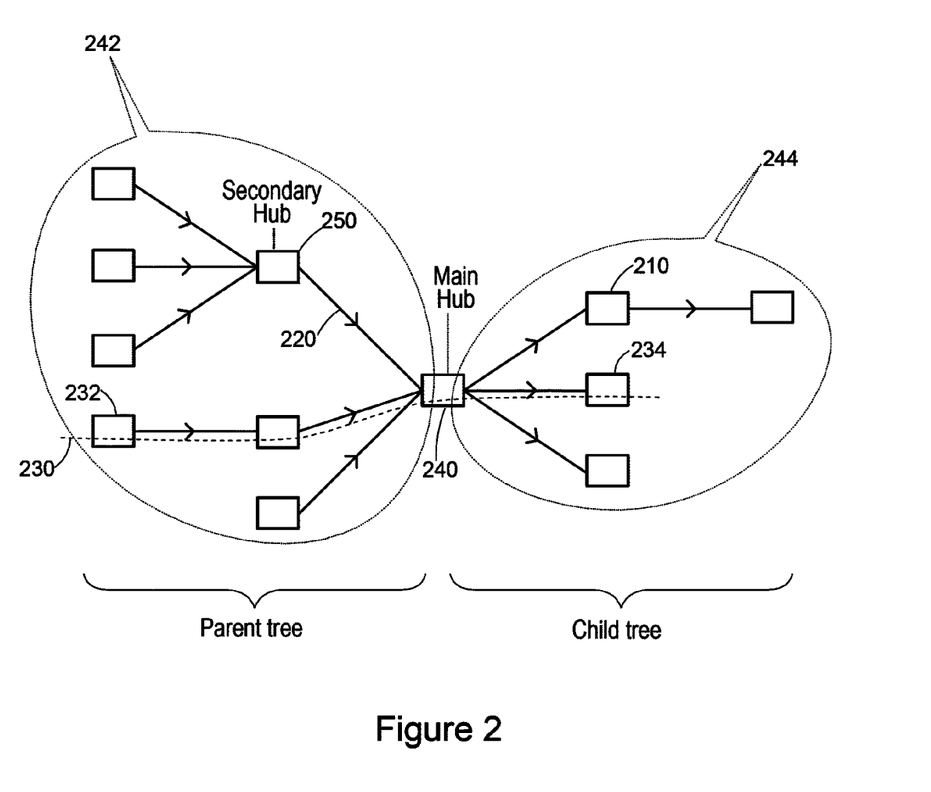
FIG. 2 shows a graph of airline routes typical of what the invention is aimed at displaying.

FIG. 2 shows a graph of airline routes typical of what the invention is aimed at displaying.

A routing graph is a directed graph, in which nodes are cities, e.g.: 210. The graph edges, i.e., the lines between the nodes, e.g.: 220, indicate which cities are actually connected by scheduled airline flights. A path in the graph, e.g.: 230, includes any combination of connected nodes from any of the entry points on the left, e.g.: 232, to any of the exit points on the right, e.g.: 234. Such a routing graph is assumed to be acyclic, i.e., there is no possible looping path in it. Two kinds of nodes are actually considered for the drawing of the graph: the city nodes mentioned above, and airline nodes to show, when appropriate, which airline companies operate flights between city nodes. This is further discussed in the following description of the invention.

Because of the way airlines organize their networks of flights the invention rests on the assumption that there is always at least one city node in the graph which represents a main airline hub 240 through which, most, if not all, of the possible paths (i.e., the possible travel routes) go through. Thus, defining a double-tree structure, i.e.: two trees head to foot, sharing the main hub at their root. The tree on the left is the parent tree 242 and the one to the right the child tree 244. The graph is also possibly comprised of secondary hubs 250 which have a single incoming route and several outgoing routes, or the opposite.

Figure 3:
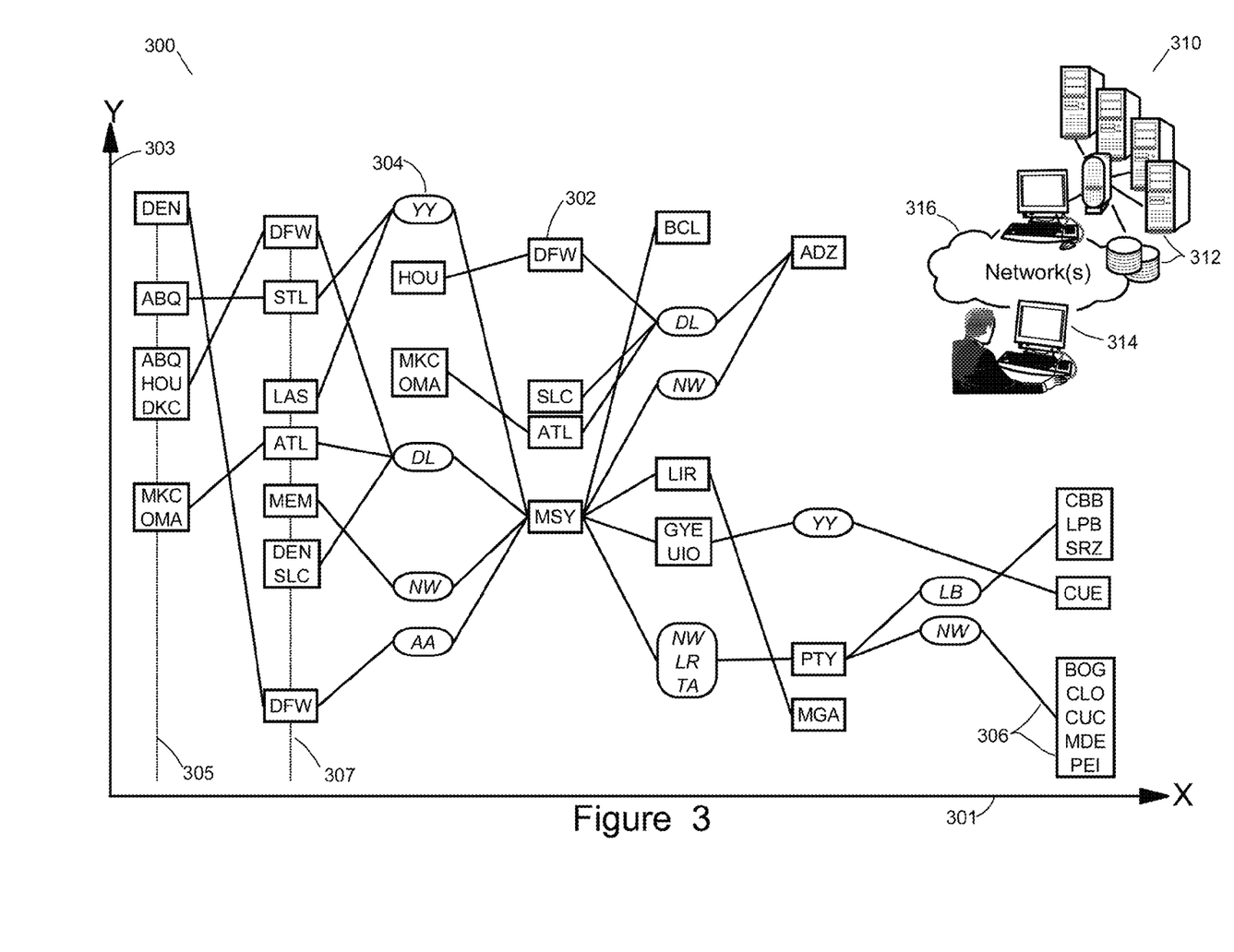
FIG. 3 is an exemplary raw graph used to illustrate the method of the invention.

The method of the invention is here after illustrated starting from the exemplary raw graph 300 shown in FIG. 3.

This initial version of the graph, which needs not to be actually displayed, is constructed from any convenient representation which can be manipulated by a computer program. This computer representation of a graph can take, e.g., the form of a list of paths similar to what is shown in FIG. 1. Other standard representations are possible. The most straightforward computer representation of a graph is the so-called adjacency matrix representation. The graph is then stored and manipulated as a binary square matrix in which rows and columns are the nodes. There is a true binary value at each row/column intersection where an edge exists between the corresponding two nodes. Binary value is false if there is no edge. If the invention does not make any assumption on the internal computer representation of the graphs to be displayed it is often convenient to have a computerized representation in which each node description keeps tracks of all child nodes and parent nodes to which it is directly connected so that a graph can be easily parsed in both directions.

Hence, in a computerized and networking environment 310, e.g., the one of a GDS like AMADEUS discussed in the background section, a computer program implementing the method of the invention is assumed to be able, from any appropriate representation of the graph, stored in storage resources associated with computing facilities 312 to display on the screen 314 of an end-user a graphic representation of the stored graph. The end-user is typically a professional of the airline industry locally connected, e.g., on a local area network (LAN) to the computerized resources of the GDS or remotely connected through any combination of private and public wide-area networks including the Internet 316. The end-user can be as well a remotely connected client of an online application running on a server of a travel service provider, possibly using the computing facilities and travel services of a GDS, and implementing the method of the invention to display airline routes in a graphic mode.

The exemplary raw graph 300 contains two types of nodes. The city nodes already discussed, each drawn as a rectangle containing the corresponding IATA three-letter city code, e.g.: DFW 302 which makes reference to Dallas Fort-Worth, Tex., USA. The other type of nodes designates which airline operates flights between two city nodes, drawn as a rounded rectangle it contains the corresponding two-letter airline code e.g.: YY 304. For sake of clarity, the city nodes that share a same parent or child node are regrouped and drawn as a single rectangle and are thus connected with a single edge, e.g.: 306.

Standard conventions are used to draw the exemplary acyclic graph of FIG. 3:

In this two-dimensional X-Y view of a graph, direction of the edges corresponds to the direction of the X axis 301. For a given node, a parent node is situated on its left and a child node on its right. As already mentioned, all paths or travel routes in the graph start from a most-left entry node 305 to end with a most-right exit node, e.g.: 306. The nodes of same ranks are vertically aligned occupying a discrete position along the X-axis. Hence, most-left entry nodes 305 occupy rank 0, next ones rank 1 307 and so on. The arrangement of the nodes along the X-axis of the graph, at discrete equally-distant positions is not part of the invention. To perform this task, efficient algorithms exist which minimize horizontal distances between ranks of linked nodes. They are re-used by the invention to produce the exemplary raw graph of FIG. 3 in which all nodes are already distributed at discrete positions along the X-axis.

Finding the best vertical position of the nodes along the Y-axis 303 in order to obtain a graph whose structure can be clearly displayed in a two-dimensional space is the critical step that generally requires a multi-pass algorithm as discussed in the background section. Contrary to the X-axis, the nodes are permitted to occupy any continuous position in the Y direction provided the above objective of obtaining an easy to interpret graph is reached. This is generally obtained with a minimum number of edge crossings.

Figure 4:
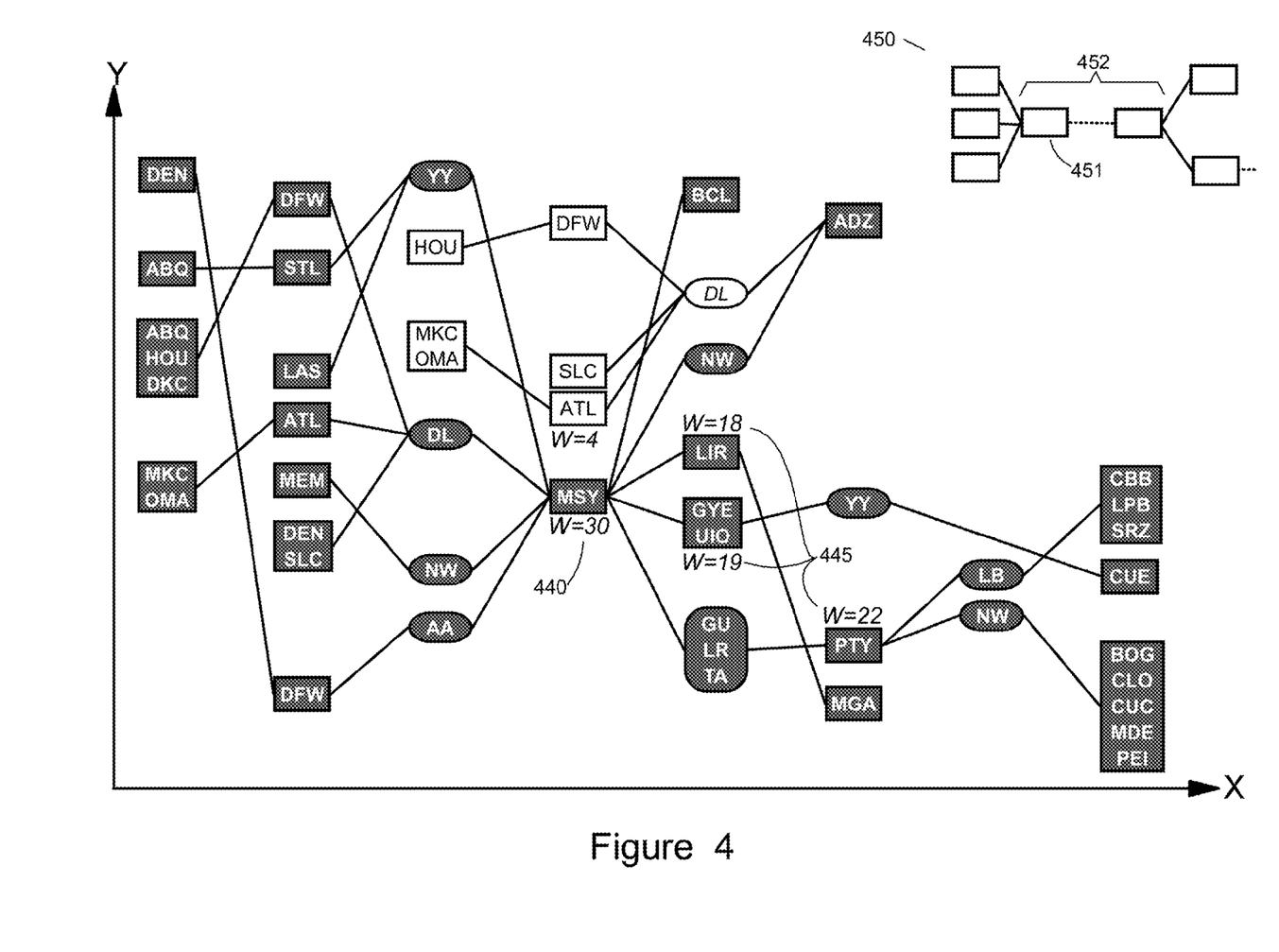
FIG. 4 shows the main double-tree structure and main hub node determined from the above raw graph.

The first step of the method according to the invention consists in finding, from the computer representation of the graph, the node which is the main hub, i.e., the node as shown in FIG. 2 which is at the root 240 of the largest double-tree structure. To achieve this, each node of the structure is given a weight which is calculated by simply counting the total number of nodes belonging to the double-tree structure of which it is assumed to be the root. FIG. 4 shows the weights of a few nodes 445 in the exemplary graph used to illustrate the invention. This way of doing simply and quickly finds the main hub which is node 440 (MSY) with a highest weight of 30 in this example. All other nodes have lower weights.

In order to carry out an efficient computation process a table, part of the computer representation of the graph, holds actually two values for each node N, i.e.: the number of children nodes C(N), including the node N itself; and the number of parents P(N), including the node N itself. Hence, the weight of a node is just: C(N)+P(N)−1. Prior to computation, the table is initialized with zeroes. Then, each graph node is gone through in order to determine its weight. The node having the highest weight thus becomes the main hub node of the current double-tree structure.

In some double-tree structures, an example of which is shown 450, there are possibly more than one node sharing a same highest weight. In fact, all middle nodes 452 share a same weight in this example. In which case, any one can be selected to become the main hub, e.g., the first one 451.

When the main hub node has been determined, the corresponding double-tree structure is also determined and its layout can be computed. In the example of FIG. 4, the thirty nodes belonging to the double-tree structure whose root is MSY 440 are shown with a dark background. The layout of the main double-tree structure is computed by recursively computing the height of each of its nodes taking into account the child and parent nodes of the node currently considered. Each node of the double-tree structure (but the main hub node itself) is either a child node or a parent node of the main hub node.

Figure 5:
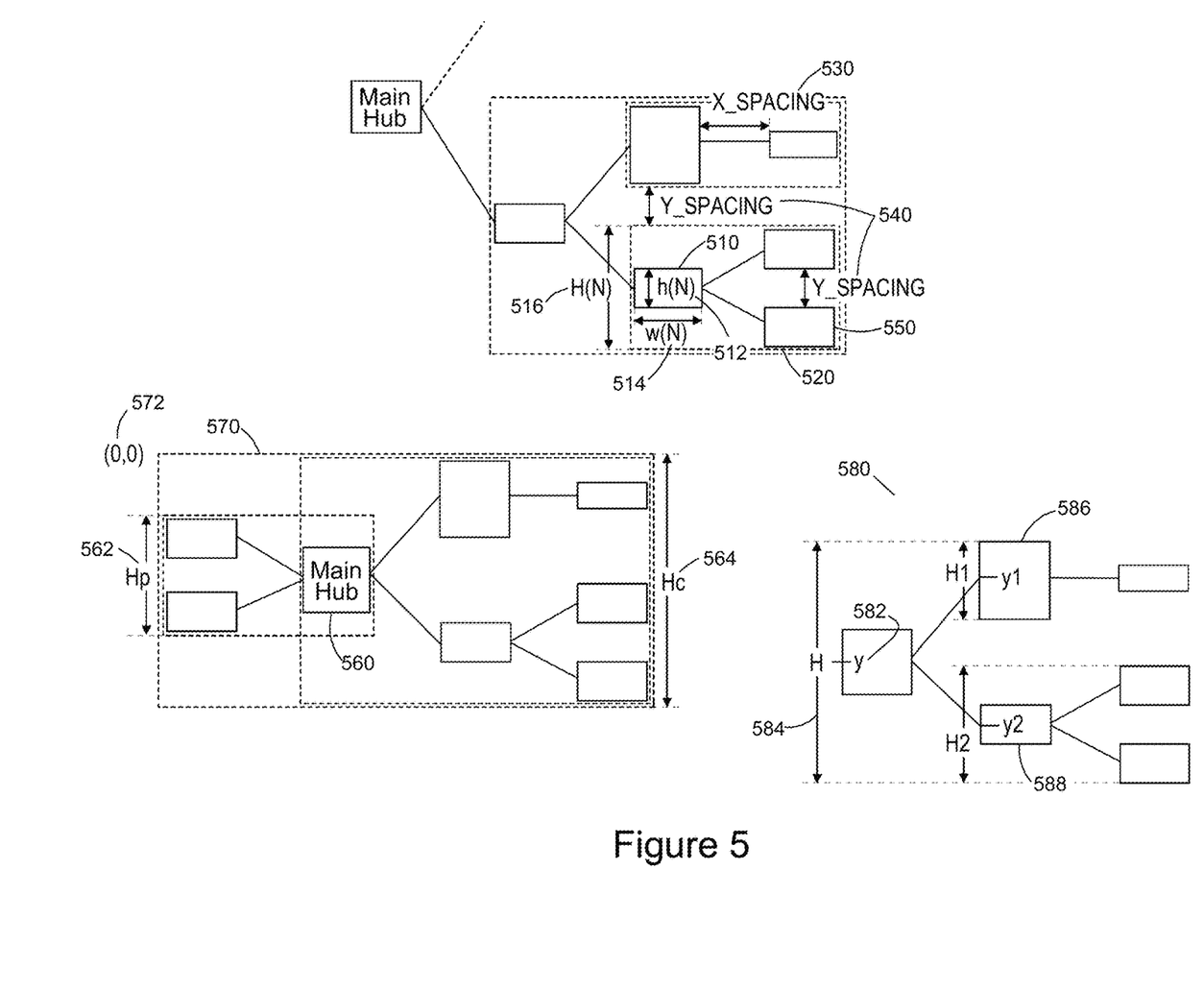
FIG. 5 illustrates the method of computing node heights and Y-coordinates of a double-tree structure according to the invention.

As shown in FIG. 5, for each node N: h(N) 512 and w(N) 514 are respectively the height and the width of the Nth node currently considered 510. H(N) is the height of the box 520 surrounding the node N and including either its children nodes (if N is a child node of the main hub node), or its parents nodes (if N is a parent node of the main hub node).

There are only two parameters, namely: X_SPACING 530 and Y_SPACING 540, which need to be set individually to adjust the visual rendering of the display according to user's preferences. X_SPACING is the chosen horizontal distance between nodes of consecutive ranks. Y_SPACING is the chosen vertical distance between children or parent boxes of same rank.

Hence, the height of a node, i.e.: H(N), is computed as follows:
if node is a leaf (i.e., a node at the periphery of the graph that has no child or no parent node such as 550), then H(N)=h(N).

Otherwise, the total height of all children nodes (of current node N, i.e., 510 in this example) plus the number of vertical intervals between children nodes multiplied by the chosen Y_SPACING is computed. Whichever of this latter value and of h(N) is larger is chosen as the H(N) value for the current node considered.

A similar computation is performed on all parent nodes so that a single H(N) value is computed for each node of the graph from the main hub node.

Only the main hub node 560 has two values associated with: a parent node height (Hp) 562 and a child node height (Hc) 564. The height of surrounding box 570 of the complete double-tree structure (Htree) is set to whichever is higher of above Hp or Hc values. The upper left corner 572 of the surrounding box is used as the referential point for the nodes coordinates.

Then, to obtain the layout of the graph, horizontal x(N) and vertical y(N) coordinates of each node need to be computed. The horizontal x(N) coordinates are straightforwardly derived from the rank of each node as previously discussed. Computation of the vertical y(N) coordinates is illustrated with example 580 of FIG. 5. In this example, y value 582 is known since the total height of the current node (H) 584 has been previously computed. Then, the y coordinates of the two children nodes 586 and 588, i.e., y1 and y2 are simply computed knowing the heights H1 and H2 of the respective nodes and the value chosen for the vertical interval Y_SPACING:

$$-y1=y-H/2+H1/2$$

$$-y2=y-H/2+H1+Y\_SPACING+H2/2$$

A similar type of computation is done on all children and parent nodes.

Figure 6:
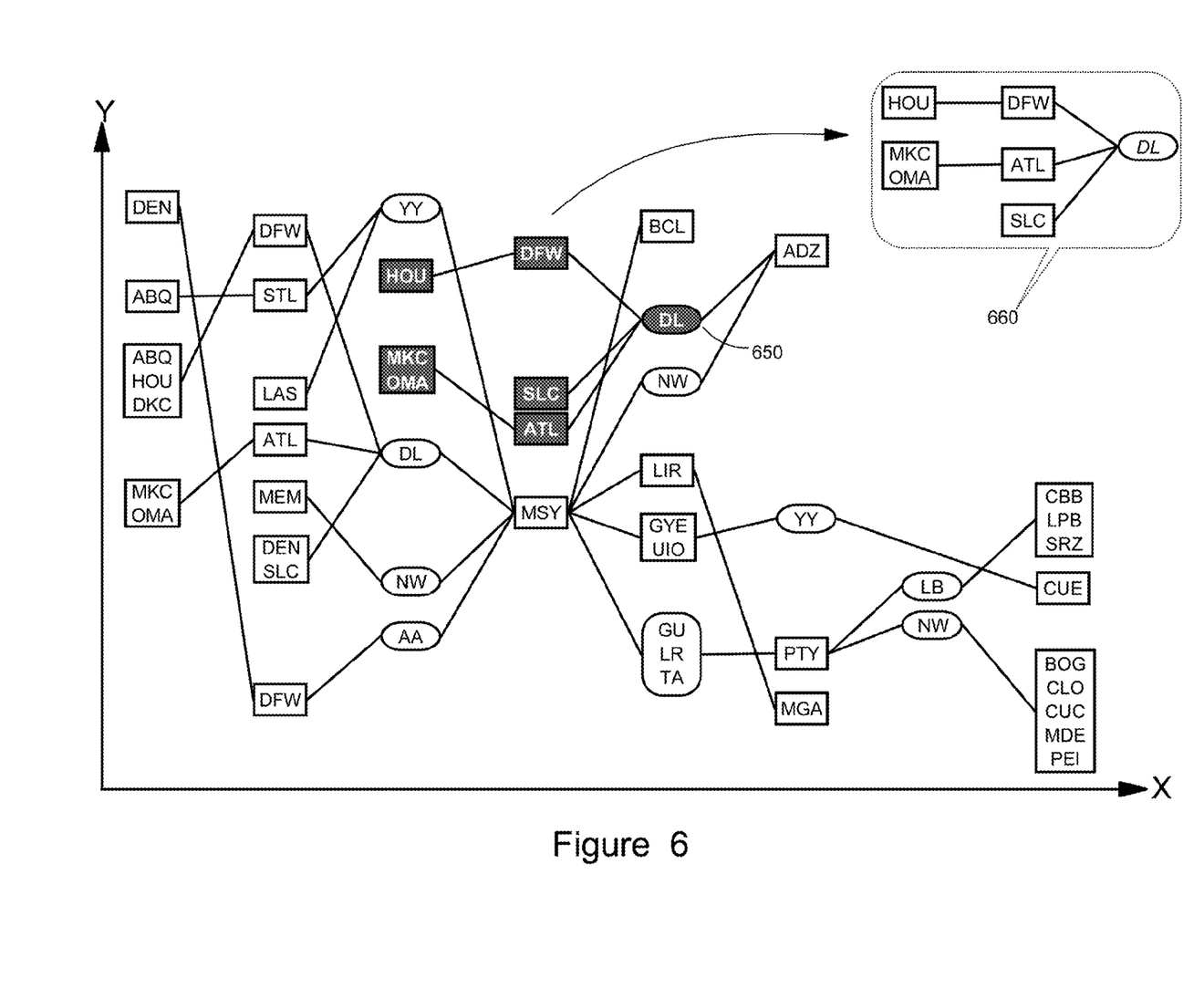
FIG. 6 shows a sub-graph of nodes left in raw graph after the main double-tree structure has been processed.

Once the nodes of the main double-tree structure have all been processed the method according to the invention assumes that above processing steps are reapplied on the remaining nodes. In the example used to illustrate the invention those remaining nodes are those shown in FIG. 6 with a dark background. They form in this example a single independent sub-graph on which the method is reapplied first by determining, in the same way as previously explained, a main hub node which is node DL 650 in this case. Then, the height and Y-coordinate of each node of the sub-graph are computed as above to obtain what is shown in 660.

Figure 7:
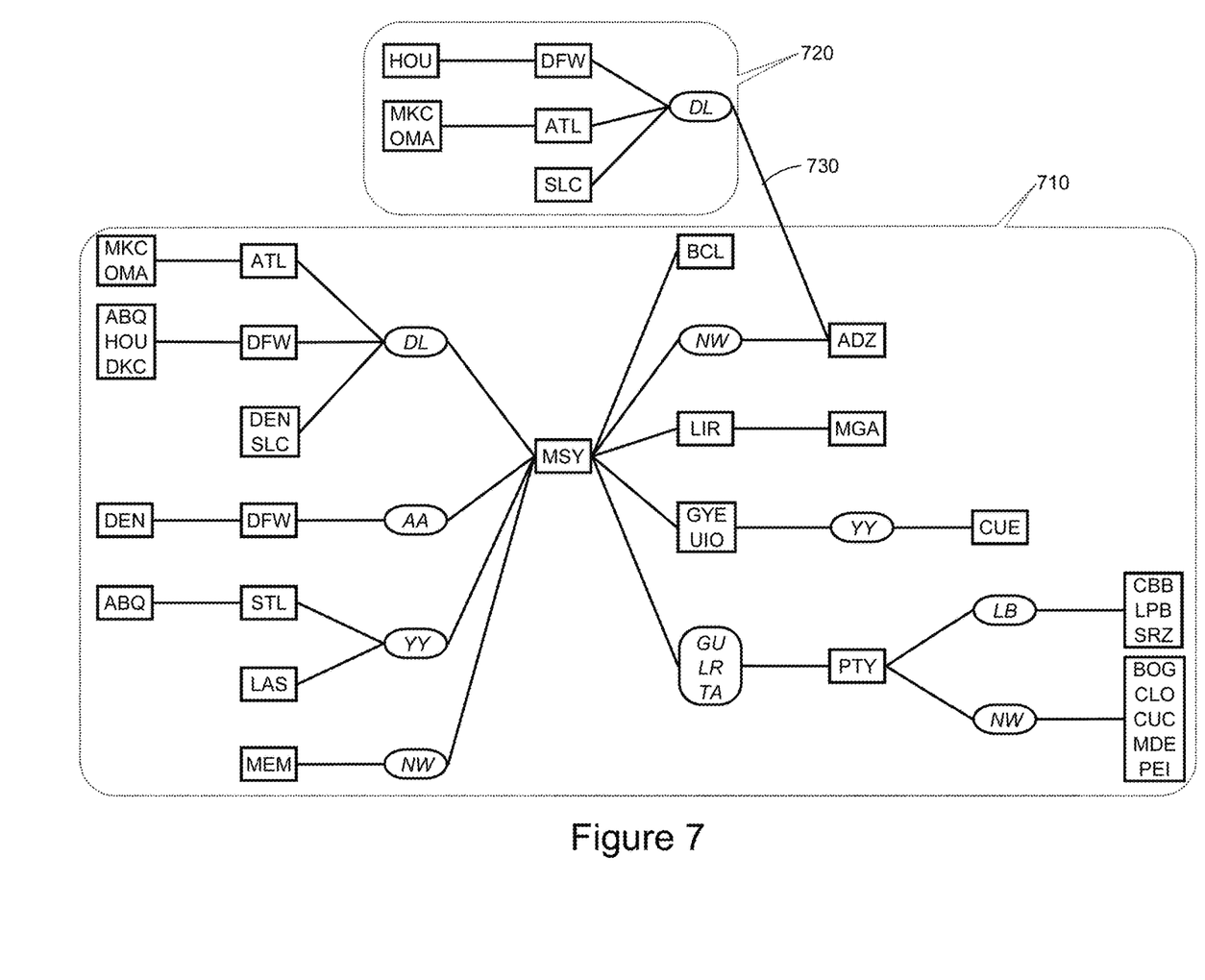
FIG. 7 shows how the main double-tree structure and the sub-graph are merged to be displayed.

The same processing steps are applied as long as there are nodes left and sub-graphs to process. The end result is what is shown in FIG. 7 where there is a main double-tree 710 and only one sub-graph 720 in this particular example. In the general case there are potentially several, often smaller, double-trees interconnected with the main double-tree. Each double-tree is considered as a box whose layout is frozen: 710, 720. The last processing step consists in positioning each smaller double-tree in the layout of the main double-tree where there is some free space left and interconnecting them 730 if applicable. Indeed, depending on the structure of the initial graph, there may be no sub-graph to process and sub-graphs may be possibly disjoint in which case there is no interconnection between them.

Figure 8:
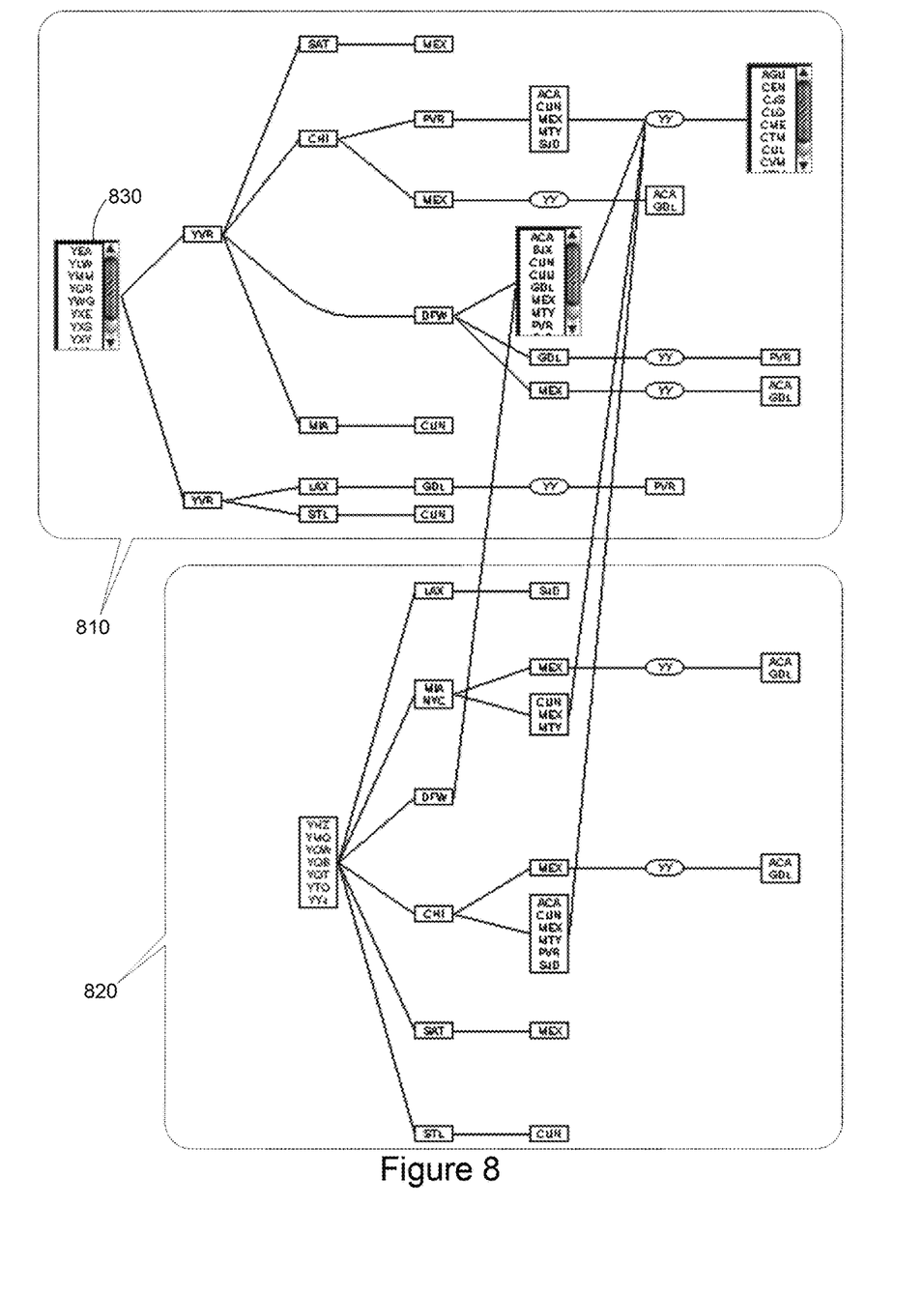
FIG. 8 shows another example of a routing graph processed with the method of the invention.

FIG. 8 shows an example of a routing graph comprised of two main sub-graphs, i.e.: 810 and 820, with some interconnections between the sub-graphs after it has been handled by the method of the invention. One will notice that if a node includes too many destinations or airlines it is automatically displayed as a scrollable list 830 in order to keep its height below a predefined size so as to facilitate the overall display.

Figure 9:
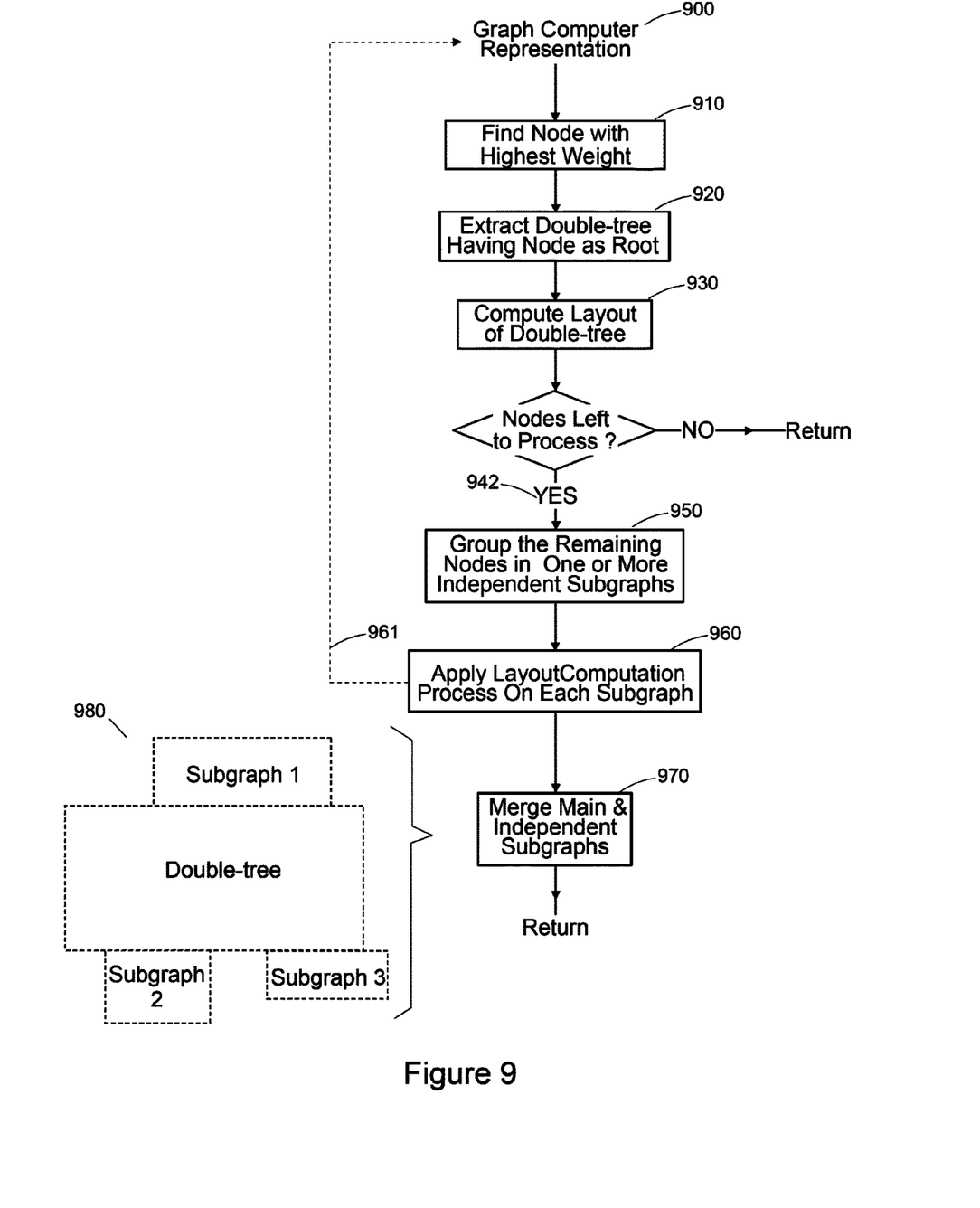
FIG. 9 is a summary of the steps of the method according to the invention to display a routing graph.

FIG. 9 is a summary of the steps of the method according to the invention to display a routing graph.

As already mentioned the method does not assume any particular computer representation 900 of the graph to be displayed. The method works from any appropriate graph representation provided it can be stored and manipulated by a program implementing the method of the invention and executing on standard computing and storing resources ranging from those made available by large computing centers to the ones of a single individual computer.

The method first attributes a weight to each node of the graph to be displayed 910. Node weights are calculated assuming that the current node considered is possibly the root of a double-tree structure as discussed in FIG. 2. Then, the weight is just the number of nodes pertaining to the current tree structure, i.e., the node itself, the parent nodes (if any) and the child nodes (if any) that are linked directly to the current node.

Once node weights have all been calculated the node having the highest weight becomes the current main hub node 920. If several nodes share a same highest weight only one is selected as previously discussed. This also defines a current double-tree structure of nodes on which the steps of the method for computing the layout of a double-tree graph structure as described in previous figure are applied 930.

When the nodes of the current double-tree structure have all been processed the algorithm checks if there are remaining nodes 940. If there are indeed nodes left 942 that do not pertain to the double-tree structure just processed, they are grouped in one or more independent sub-graphs on which the layout computation algorithm is reapplied 960 as many times as necessary 961. The algorithm first manages to attribute a unique integer index to each parent and child node belonging to a same sub-graph.

When all independent sub-graphs have been processed the main and subsequent independent sub-graphs possibly produced are merged 970 to be displayed together as shown, for example, in FIGS. 7 and 8. In the general case, there is one double-tree structure (main graph) and, possibly, several sub-graphs to be merged and displayed 980. They all have a surrounding box. Only those boxes need to be considered for the layout. Then, sub-graph boxes are simply juxtaposed to the double-tree box, with no overlapping of the boxes. Since the x-coordinates of the sub-graphs have been already computed the (discrete) x coordinates of all sub-graph boxes are known. Hence, each sub-graph is placed as close as possible to the double-tree box, taking into account any sub-graphs that have been already positioned. The total length of the edges linking the double-tree to the current sub-graph is considered to decide which sub-graph position is best. Sub-graphs can be placed above or below the main double-tree structure.

What is claimed is:

1. A method of generating a graph of nodes adapted to the display of travel routes, the method comprising:
   using at least one computer, finding a node of highest weight among all nodes of the graph after each node is attributed a weight based on a number of nodes pertaining to a double-tree structure of nodes of which each node is assumed to be the root;
   using the at least one computer, extracting the double-tree structure of nodes having the node of highest weight as root;
   using the at least one computer, computing a layout of the double-tree structure of nodes;
   using the at least one computer, if there are remaining nodes left, grouping the remaining nodes in one or more sub-graphs;
   using the at least one computer, iteratively computing a layout of the one or more sub-graphs; and
   using the at least one computer, merging the one or more sub-graphs with the double-tree structure of nodes.

2. The method of claim 1 wherein the double-tree structure of nodes is comprised of parent nodes and/or of child nodes respectively situated on left side and right side of the root node.

3. The method of claim 2 wherein a node height is recursively computed for each node of the graph by gathering node heights of all attached parent nodes or child nodes.

4. The method of claim 3 wherein height of the root node is whichever is larger of height of parent nodes or height of child nodes.

5. The method of claim 4 wherein height of the root node determines the size of the double-tree structure of nodes and the referential from which all node coordinates are computed.

6. The method of claim 5 wherein Y-coordinate of each node is recursively computed from node heights of all attached parent nodes or child nodes.

7. The method of claim 1 wherein the double-tree structure of nodes and the one or more sub-graphs have a frozen layout of Y and X coordinates of nodes.

8. The method of claim 7 wherein Y and X coordinates include predetermined Y and X spaces.

9. The method of claim 8 wherein the merging step consists in a vertical juxtaposition of the double-tree structure of nodes and of the one or more sub-graphs.

10. The method of claim 9 wherein the merging step includes interconnecting the one or more sub-graphs with the double-tree structure of nodes.

11. The method of claim 1 wherein the graph nodes designate airline companies or cities served by the airline companies and wherein graph edges represent scheduled airline flights between cities.

12. The method of claim 11 wherein the graph nodes comprise a plurality of cities or a plurality of airline companies.

13. The method of claim 12 wherein at least one of the graph nodes is displayed as a scrollable list of cities or of airline companies.

14. The method of claim 1, further comprising displaying the graph on a display.

15. The method of claim 1, further comprising communicating the graph to a remote client.

16. A system comprising:
    at least one computer; and
    computer readable code configured upon execution by the at least one computer to generate a graph of nodes adapted to the display of travel routes by finding a node of highest weight among all nodes of the graph after each node is attributed a weight based on a number of nodes pertaining to a double-tree structure of nodes of which each node is assumed to be the root; extracting the double-tree structure of nodes having the node of highest weight as root; computing a layout of the double-tree structure of nodes; if there are remaining nodes left, grouping the remaining nodes in one or more sub-graphs; iteratively computing a layout of the one or more sub-graphs; and merging the one or more sub-graphs with the double-tree structure of nodes.

17. The system of claim 16, further comprising a display, wherein the computer readable code is further configured to display the graph on the display.

18. The system of claim 16, wherein the computer readable code is further configured to communicate the graph to a remote client.

19. A computer program product stored on a non-transitory computer readable storage medium, comprising computer readable code stored on the non-transitory computer readable storage medium and configured upon execution by at least one computer to generate a graph of nodes adapted to the display of travel routes by finding a node of highest weight among all nodes of the graph after each node is attributed a weight based on a number of nodes pertaining to a double-tree structure of nodes of which each node is assumed to be the root; extracting the double-tree structure of nodes having the node of highest weight as root; computing a layout of the double-tree structure of nodes; if there are remaining nodes left, grouping the remaining nodes in one or more sub-graphs; iteratively computing a layout of the one or more sub-graphs; and merging the one or more sub-graphs with the double-tree structure of nodes.

20. The computer program product of claim 19, wherein the computer readable code is further configured to communicate the graph to a remote client.

* * * * *